(12) United States Patent
Williams

(10) Patent No.: US 8,648,857 B2
(45) Date of Patent: *Feb. 11, 2014

(54) VIDEO PROCESSING SYSTEM AND METHOD FOR INTRODUCING GRAPHICAL FEATURES INTO VIDEO IMAGES IN A SCENE

(75) Inventor: Michael John Williams, Winchester (GB)

(73) Assignee: Sony Corporation, Tokyo (JP)

( * ) Notice: Subject to any disclaimer, the term of this patent is extended or adjusted under 35 U.S.C. 154(b) by 877 days.

This patent is subject to a terminal disclaimer.

(21) Appl. No.: 12/190,106

(22) Filed: Aug. 12, 2008

(65) Prior Publication Data

US 2009/0066696 A1 Mar. 12, 2009

(30) Foreign Application Priority Data

Sep. 7, 2007 (GB) .................................. 0717473.3

(51) Int. Cl.
*G06T 15/20* (2011.01)
*G09G 5/00* (2006.01)

(52) U.S. Cl.
USPC .......................................... 345/427; 345/632

(58) Field of Classification Search
None
See application file for complete search history.

(56) References Cited

U.S. PATENT DOCUMENTS 5,491,517 A 2/1996 Kreitman et al.

(Continued)

OTHER PUBLICATIONS

Xinguo Yu, Xin Yan, Tran Thi Phuong Chi, and Loong Fah Cheong. 2006. Inserting 3D projected virtual content into broadcast tennis video. In Proceedings of the 14th annual ACM international conference on Multimedia (Multimedia '06). ACM, New York, NY, USA.*

(Continued)

*Primary Examiner* — Daniel Hajnik
(74) *Attorney, Agent, or Firm* — Oblon, Spivak, McClelland, Maier & Neustadt, L.L.P.

(57) ABSTRACT

An image processing method introduces a graphical feature or effect into a part of one or more video images of a scene. The scene includes a view of a plurality of objects disposed on an object plane, the part of the video images including one of the plurality of objects on the object plane. The method includes forming a three dimensional model view of the object plane, calculating a transform matrix for transforming points in the model of the object plane into the view of the object plane in the video image, forming the graphical feature or effect in the model of the object plane, transforming the graphical feature or effect from the model to the image view of the object plane using the transform matrix, identifying the one of the plurality of object which is to be viewed within the part of the video image, in which the object is present, and extracting the part of the image view from the video images, into which the graphical feature has been transformed, the extracted part including that part of the feature of effect, which has been transformed from the model. The image processing method provides an improved way of adding a graphical feature or effect to a plane on which a plurality of objects are disposed, so that when a part of the video image, in which one of the plurality of objects, is viewed, the graphical feature or effect appears to the viewer to be a natural scene as if the graphical feature or effect is actually present.

23 Claims, 10 Drawing Sheets

(56) References Cited

U.S. PATENT DOCUMENTS

| | | | |
|---|---|---|---|
| 5,663,717 A * | 9/1997 | DeLuca | 340/323 R |
| 5,729,471 A * | 3/1998 | Jain et al. | 725/131 |
| 5,850,352 A * | 12/1998 | Moezzi et al. | 345/419 |
| 5,892,554 A * | 4/1999 | DiCicco et al. | 348/584 |
| 6,141,060 A * | 10/2000 | Honey et al. | 348/578 |
| 6,750,919 B1 * | 6/2004 | Rosser | 348/584 |
| 7,230,653 B1 * | 6/2007 | Overton et al. | 348/584 |
| 2003/0032878 A1 * | 2/2003 | Shahidi | 600/429 |
| 2004/0032495 A1 * | 2/2004 | Ortiz | 348/157 |
| 2005/0001852 A1 | 1/2005 | Dengler et al. | |
| 2007/0146372 A1 * | 6/2007 | Gee et al. | 345/474 |
| 2008/0312010 A1 * | 12/2008 | Marty et al. | 473/447 |

OTHER PUBLICATIONS

Xinguo Yu, Xin Yan, Tze Sen Hay, and Hon Wai Leong. 2004. 3D reconstruction and enrichment of broadcast soccer video. In Proceedings of the 12th annual ACM international conference on Multimedia (Multimedia '04). ACM, New York, NY, USA, 260-263.*

Sportsvision Video from 1998, titled: "ESPN Tutorial for Fans (1998)"; Video and select screenshots of video; retrieved from: http://www.ieeeghn.org/wiki/index.php/Sportvision.*

* cited by examiner

VIDEO PROCESSING SYSTEM AND METHOD FOR INTRODUCING GRAPHICAL FEATURES INTO VIDEO IMAGES IN A SCENE

FIELD OF THE INVENTION

The present invention relates to methods of introducing a graphical feature or effect into a part of one or more video images of a scene. The present also relates to an image processing apparatus operable to introduce a graphical feature or effect into a part of one or more video images of a scene.

BACKGROUND OF THE INVENTION

It is known to provide an arrangement in which video or television images of a sporting event are embellished by displaying computer generated images within the video images so that for example, these are superimposed on a field of play. For example, advertisements or club emblems of teams which are playing each other in a football match, for example, can be superimposed on an image of the football pitch which is captured by a camera, so that it appears that the players are playing on top of the images of the emblems which are superimposed on the football pitch. In order to achieve an effect wherein a computer generated image is superimposed on an image of a particular sports field, it is known to calibrate an image produced by the camera with respect to a model representing that image.

The term model as used herein will be used to designate a simulated representation of an object, which has a planar surface, such as a field of play from which images of that field of play are to be captured using a camera.

As disclosed in an article entitled "Flexible Calibration by Viewing a Plane from Unknown Orientations" by Zhengyou Zhang published in 1999 in ICCV, volume 1, page 666, there is disclosed a method of self-calibration in which, a camera is moved in a static scene, and a rigidity of the scene provides two constraints on the camera's internal parameters from one camera displacement by using image information alone. The self-calibration is in contrast to photo-grammetric calibration in which a calibration object whose geometry in 3-D space is known with very good precision. The article discloses an arrangement for translating points within a model and points within the image so that points within the model can be mapped to the image and vice versa. However, the disclosed technique requires that a pattern be attached to planar surface of the image, which is captured before an estimation of five intrinsic parameters can be generated in order to translate between the model and the image.

Improvements in or relating to a process in which features or effects within a model can be represented within an image in a plane of a field of view such as a sporting field of play represent a technical problem particularly, for example when the translation is performed in real time.

STATEMENT OF INVENTION

According to the present invention there is provided a method of introducing a graphical feature or effect into a part of one or more video images of a scene. The scene includes a view of a plurality of objects disposed on an object plane, the part of the video images including one of the plurality of objects on the object plane. The method includes forming a three dimensional model view of the object plane, calculating a transform matrix for transforming points in the model of the object plane into the view of the object plane in the video image, forming the graphical feature or effect in the model of the object plane, transforming the graphical feature or effect from the model to the image view of the object plane using the transform matrix, identifying the one of the plurality of objects, which is to be viewed within the part of the video image, in which the object is present, and extracting the part of the image view from the video images, into which the graphical feature has been transformed, the extracted part including that part of the feature or effect, which has been transformed from the model.

Embodiments of the present invention provide an improved technique for adding a graphical feature or effect to a plane on which a plurality of objects are disposed, so that when a part of the video image, in which one of the plurality of objects, is viewed, the graphical feature or effect appears to the viewer to be a natural scene, as if the graphical feature or effect is actually present.

In some examples, the video signals are generated by a high definition video camera, which is arranged to view the scene in which the plurality of objects are disposed on an object plane. Thus in one example, the video camera is arranged to view the entire scene, so that the video signals represent the view of the whole scene include, for example, the entire football pitch and the players thereon. Since the video images produced are high definition images, when the part of the video images is extracted, a quality of the extracted image remains relatively high.

Embodiments of the present invention can utilise a technique which automatically calibrates an image captured by a camera with respect to a model of that image by finding an optimised transformation of points within the model plane or the image produced by the camera using lines in a plane of the object, which set out features of the object as seen within the image view produced by the camera. The transform matrix can therefore be used to introduce the graphical feature or effect into the object plane in the video images. However, other manual or automatic techniques can be used in other examples and so the calibration technique for locking the model to the camera view is not limited to a particular calibration technique.

Various further aspects and features of the present invention are defined in the appended claims.

BRIEF DESCRIPTION OF DRAWINGS

Embodiments of the present invention will now be described, by way of example with reference to the accompanying drawings where like parts have been designated with like reference numerals and wherein.

DESCRIPTION OF EXAMPLE EMBODIMENTS

Example embodiments of the present invention will now be explained with reference to an example illustration of a sporting event which will be a football match. As such, embodiments of the present invention provide a technique for reproducing a simulated effect or feature such as a map or emblem within the model view and transposing that model view of the graphical feature into a plane of the football pitch within the image view. Furthermore, embodiments of the present invention provide a technique for automatically locking the model view of the football pitch to the image view of the football pitch which is captured by the camera. The image provided by the camera is therefore a two dimensional view of the football pitch. Since the camera is locked to the model view effects such as features of simulated objects and other special effects can be represented within the plane of the model and automatically translated to the plane of the football pitch within the two dimensional image captured by the camera to produce a view of the football pitch within a live video feed which includes that feature.

Figure 1:
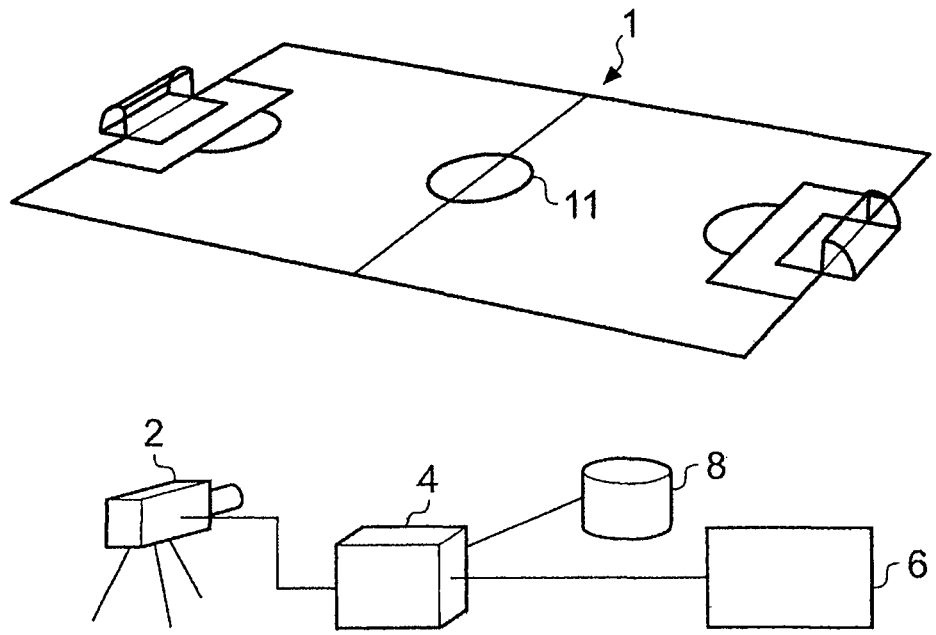
FIG. 1 is a schematic block diagram representing a system for processing images produced by a camera of an example object which is a football pitch.

An example embodiment of the present invention is shown in FIG. 1 in which a football field 1 is captured within a video image produced by a camera 2 and fed to a processing device 4. The processing device 4 may perform all processing required to lock an image view of the football pitch 1 onto a model view of the football pitch so that effects within the model view can be represented within the image view. Thus a live video feed produced by the camera 2 can be fed to the processing unit 4 for processing and representations within the plane of the model can be applied to the live video feed in real time. The video feed can be streamed to an internet gateway 6 or stored within a server 8 for access via the internet and/or other client devices such as mobile communications devices.

Figure 2:
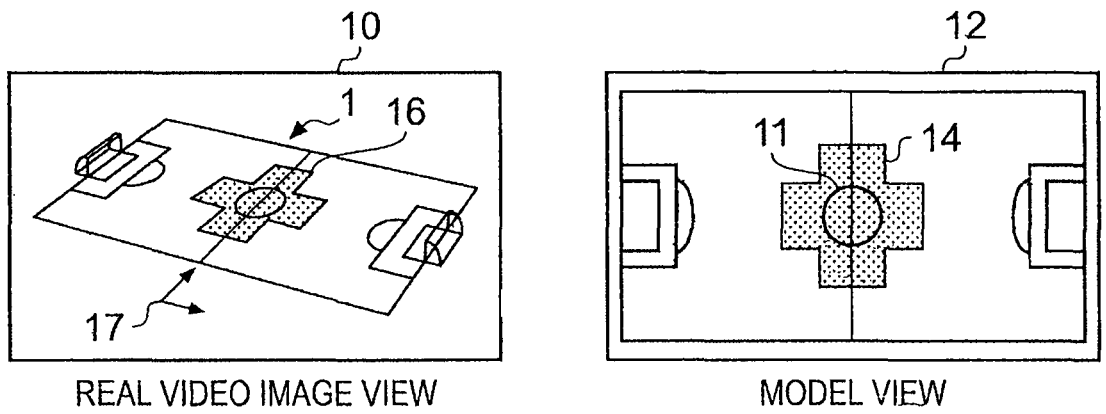
FIG. 2 is an example illustration of a mapping of the football pitch shown within the image captured by the camera and a model view of the football pitch in which a simulated graphical feature is produced within the model view and transposed onto the football pitch within the two dimensional image.

As illustrated in FIG. 2 a view of the football pitch 1 captured by the camera 2 is represented within a left-hand window 10. A model of the football pitch is represented within a model view 12. As illustrated in FIG. 2 a simulated graphical feature 14, for example, a cross shape appearing over a centre circle 11 of the football pitch 1 is generated within the model of the football pitch 12 and reproduced within the image view of the football pitch 10 within a plane of the football pitch, as represented by arrows 17.

Embodiments of the present invention are arranged to reproduce the simulated feature 14, which has been generated within the plane of the model of the football pitch 12, within the image view 10 as correspondingly within the plane of the football pitch so that the simulated feature 14 is shown within a live video feed. As illustrated by an arrow 20, to produce the simulated feature 14 within the model view, a mapping process is performed to map pixel points within the model view 12 into the plane of the football pitch 1 within the image view 10, so that appropriate changes within the image can be performed to represent the shape and characteristics of the feature 14 within the image view 10.

Generally, a process for calculating a transformation of points within the model view into the image view can be performed with respect to the model view or the image view. As will be described shortly, translation is performed from the model view into the image view although it will be appreciated that a transform matrix which allows the translation of the points from the plane of the model to the plane of the image can be calculated with respect to a translation of points from the image view to the model view and that a transformation matrix for translating the plane of the model into the plane of the image view can be calculated mathematically by inverting the transform matrix which transforms points from the model to the image.

A technique according to an example embodiment of the present invention for locking an image view of the object, such as the football pitch, to a model view of that object can be divided generally into two parts. A first part identifies a best estimate of a transform matrix for transforming points in the model to points in the image, whereas the second part provides a process for optimising that transform matrix. FIGS. 3, 4, 5 and 6 explain the first part of the operation, which identifies a best estimate of a transform matrix for transforming points from the model view into the image view.

Figure 3:
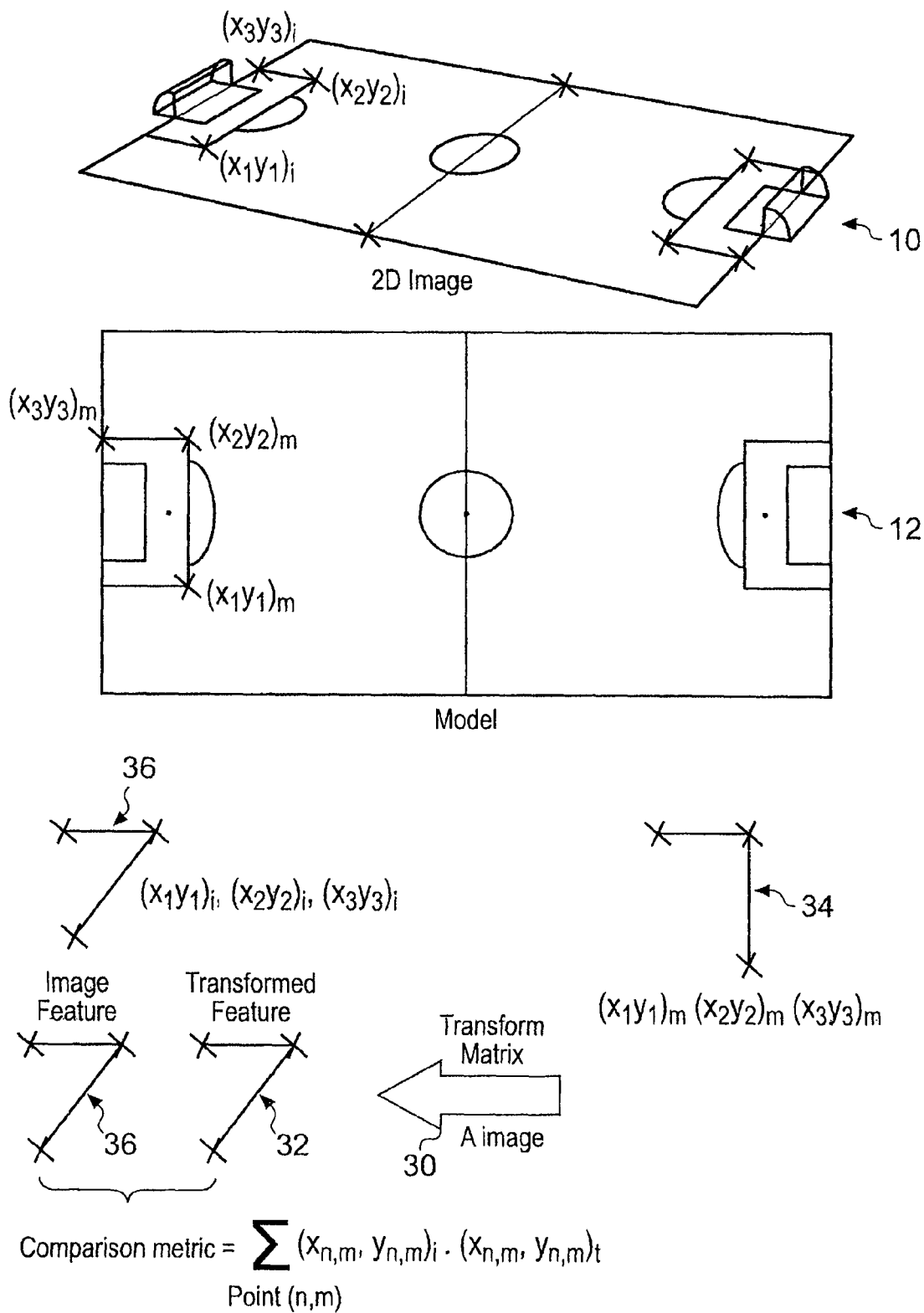
FIG. 3 provides a representation of two illustrative steps required to perform the transformation from the image view of the object into the model view and vice versa.

FIG. 3 provides an example illustration of two mathematical calculations which are required in order to generate a transformation matrix for transforming from the plane of the model to the plane of the image of the football pitch. As shown in FIG. 3, a triplet of three or more points or "triplet" is identified within the image view 10 which comprises points $(x_1y_1)_i$, $(x_2y_2)_i$, $(x_3y_3)_i$ that are non co-linear points within the image of the football pitch on the lines marking the features of the football pitch. Thus, the triplet shown in FIG. 3 within the image view 10 is that of three points within the left hand side penalty area of the football pitch 1. A triplet corresponding to that selected triplet is shown within the model view 12 as points $(x_1y_1)_m$, $(x_2y_2)_m$, $(x_3y_3)_m$.

As shown in the lower half of FIG. 3 by a transform matrix illustrated by an arrow 30, embodiments of the present invention provide an arrangement in which the triplet from the model can be transformed into the corresponding triplet within the image using a transform matrix, which is calculated in accordance with the present technique as identified below:

For the image triplet, a matrix A is computed that maps the unit triplet of points ((0 0), (1 0), (0 1)) to a triplet of points with corners $((x_1y_1)_i, (x_2y_2)_i, (x_3y_3)_i)$. As indicated above, the image triplet must contain three distinct and non-collinear points. A is a 3-by-3 matrix.

$$A_{image} = \begin{bmatrix} x_2 - x_1 & y_2 - y_1 & 0; & \ldots \\ x_3 - x_1 & y_3 - y_1 & 0; & \ldots \\ x_1 & y_1 & 1 & \end{bmatrix};$$

Correspondingly, a matrix $A_{model}$ is formed for the corresponding triplet of points $(x_1y_1)_m$, $(x_2y_2)_m$, $(x_3y_3)_m$ from the model:

$$A_{model} = \begin{bmatrix} x_2 - x_1 & y_2 - y_1 & 0; & \ldots \\ x_3 - x_1 & y_3 - y_1 & 0; & \ldots \\ x_1 & y_1 & 1 & \end{bmatrix};$$

The transform that can be used to transform all the points of the model to the corresponding points in the image view is:

$$A = (A_{model})^{-1} * A_{image};$$

In order to determine whether the transform matrix is accurate, a comparison metric is calculated for comparing a triplet of points 32 produced by transforming a triplet of points 34 from the model using a calculated transform matrix to an image 30, with the corresponding triplet from the actual image 36. As will be explained shortly and as illustrated in FIG. 3, the comparison metric is calculated by converting the lines of the image of the football pitch into 1's where a line is present as a pixel and zero where a line is not present and summing a total number of points. Thus for all pixels between a feature with lines between the transformed triplet 32 and pixels extracted from lines connecting the image triplet of points 36 where pixels contain lines within both the transform feature and the image feature. As a result a metric is produced which provides a representation of how close the transformed feature 32 is to the image feature 36. However, as will be appreciated this is just one example of a comparison metric and other comparison metrics could be used.

Figure 4:
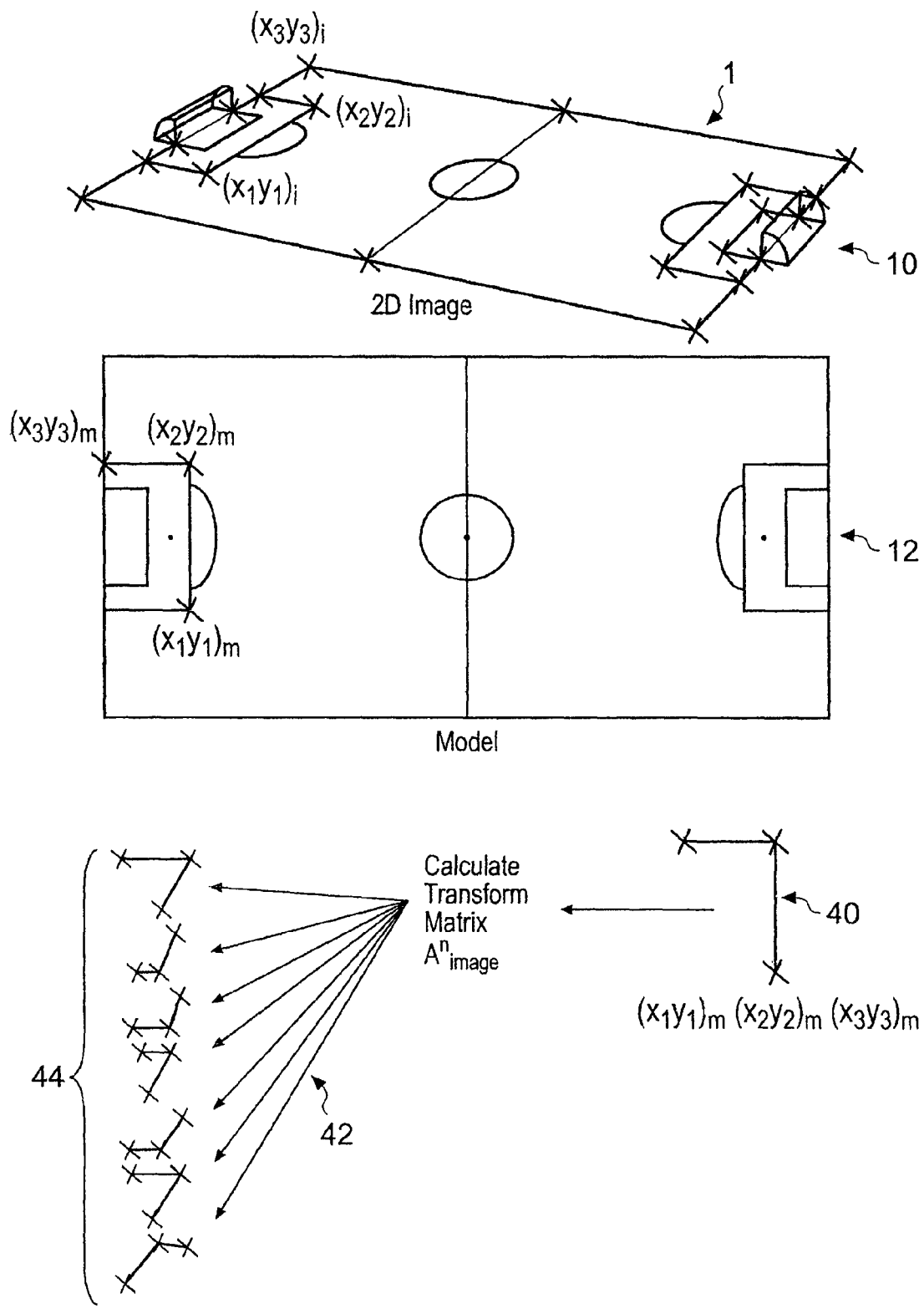
FIG. 4 is a representation of a process for calculating a first transform matrix for transforming points within the model to points within the image plane.
Figure 5:
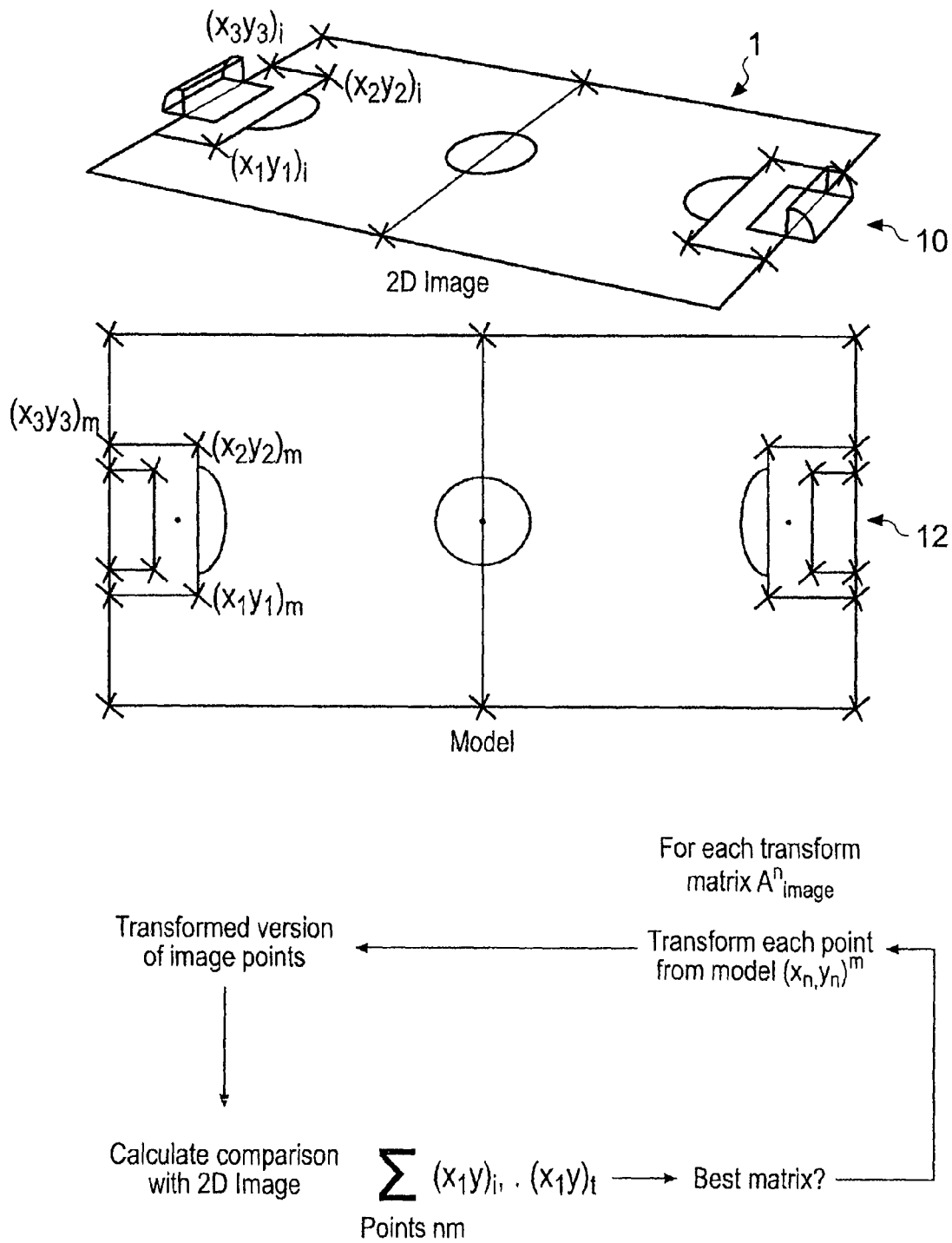
FIG. 5 is an illustration of a second part of identifying a best transform matrix for transforming points within the model to points within the image plane.

FIG. 4 provides a corresponding representation of the image of the football pitch produced by the camera 10 and the model view of the football pitch 12, in which all possible triplets have been identified within the image view of the pitch 1. However, as shown within the model view 12 only a single triplet 40 is extracted for processing. As a first step in a process of calculating a transform matrix for points within the model plane to points within the image plane, the triplet of points 40, which will form a sample triplet is compared with all possible triplets from the image view 10 produced by the camera and as illustrated by arrows 42 a transform matrix is calculated for transforming the sample triplet 40 into each of the triplets 44 which have been extracted from the image view 10. As illustrated in FIG. 5 for each transform matrix produced for transforming the sample triplet 40 from the model onto each of the triplets within the image view 44, points from the model 12 shown in FIG. 5 are transformed to points within the image to produce a corresponding representation within the two-dimensional image view as seen by the camera. The transformed points from the model are used to create a transformed feature by transforming all points connecting lines between the transformed points. The transformed feature is then compared to an image feature formed from pixels along lines connected the image triplet, as viewed by the camera and a comparison metric calculated to compare the transformed view of the pitch with the actual image view of the pitch. As a result of this process, a best transform matrix is identified, which would therefore correspond to finding the best transformation of points within the model view plane to the image view plane of the football pitch.

Figure 6:
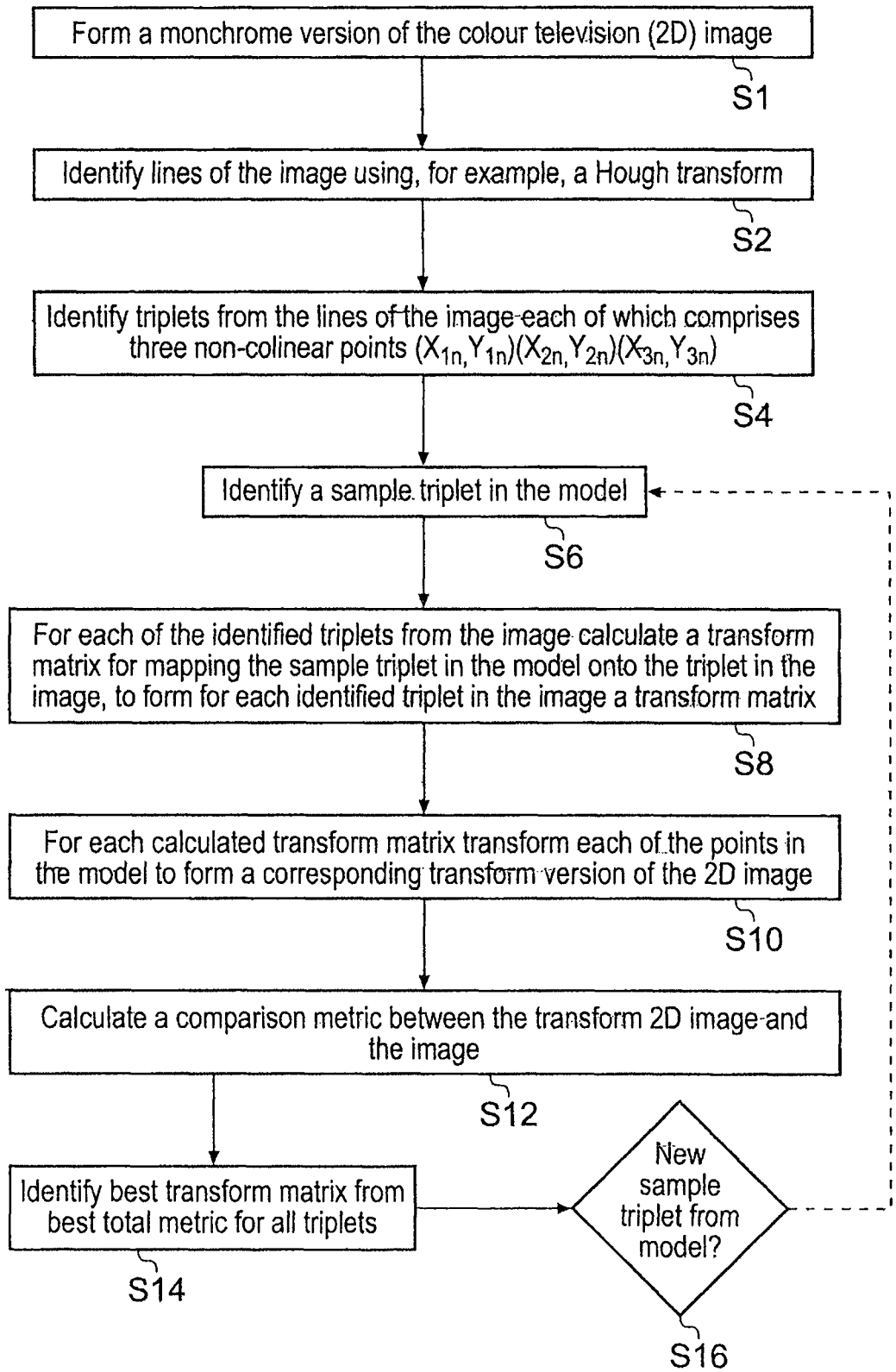
FIG. 6 is an example flow diagram illustrating a process for identifying a transform matrix for transforming points within the model plane into the image plane.

FIG. 6 provides an example flow diagram of process steps which are required in order to produce a first best guess transform matrix for transforming points within the plane of the model to the plane of the football pitch. Each of the steps represented in FIG. 6 is summarised as follows:

S1—the image of the football pitch is converted into a monochrome version of a colour television of the two-dimensional image.

S2—from the monochrome image, lines or edges of the football pitch are identified using, for example, a Hough transform or a similar transform which illustrates the presence of lines within the image.

S4—from the identified lines within the image which are representative of the markings of the football pitch, triplets are identified from the lines of the image, each of which comprises three non co-linear points $((x_{1n}y_{1n})_i, (x_{2n}y_{2n})_i, (x_{3n}y_{3n})_i)$.

S6—a sample triplet is then identified from the model which is to be used to effectively match that sample triplet from the model to the corresponding triplet of points in the image, when formed into a feature with pixels along lines connecting the triplet of points for both the sample triplet and the image triplet.

S8—for each of the plurality of identified triplets from the image view of the pitch, a transform matrix is calculated for mapping the sample triplet in the model onto the triplet in the image to form for each identified triplet in the image a transform matrix. Thus, a plurality of transform matrixes are formed, one for each identified triplet in the image view of the pitch.

S10—for each calculated transform matrix each of the points within the model view of the football pitch is transformed using that transform matrix to form a corresponding transform version of the two-dimensional image.

S12—the transformed version of the model pitch is then compared to the image view of the pitch within the two dimensional view produced by the camera. If the lines of the image and the transformed model are represented as one and the space between the lines (usually green grass) is represented as zero then as illustrated in FIG. 3, the comparison metric is formed where the lines from the transformed pitch are equal to the lines from the image view.

S14—from the comparison metrics for each transformed triplet, a best transform matrix is identified which can be used for translating all of the points within the model plane into the plane of the image view of the football pitch.

S16—optionally it is possible that the sample triplets selected from the model may not exist within the image plane. As such, if a best transform matrix is not identified, for example, where a difference between the best transform matrix and the next best is not significant (the difference is below a pre-determined threshold), then a new sample triplet is selected from the model and steps S8 to S14 are repeated again to identify a transform matrix which represents a best guess of the transformation from the plane of the model to the plane of the image.

Figure 7:
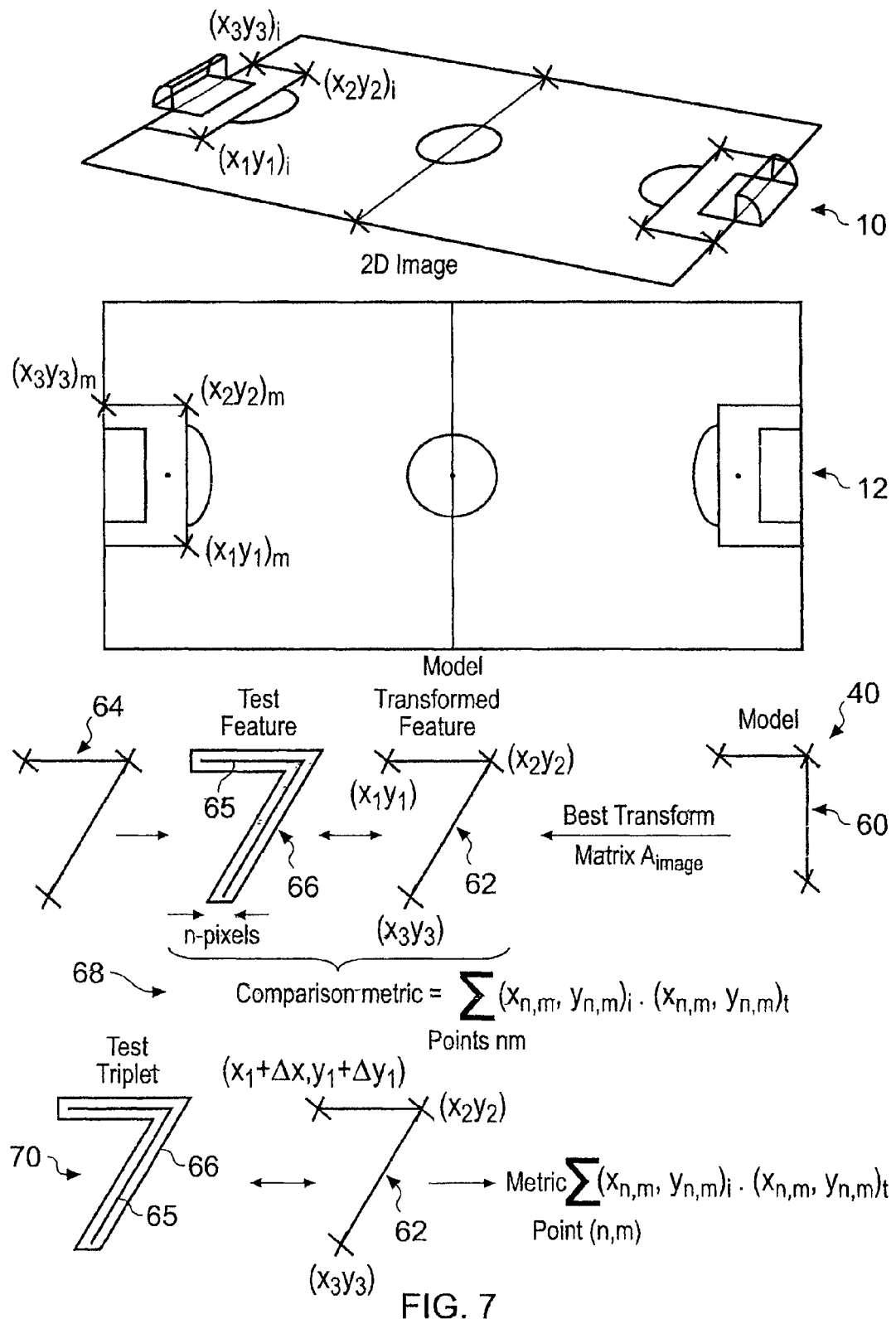
FIG. 7 is a representation of a refinement process for refining the transform matrix from the model plane to the image plane.
Figure 8:
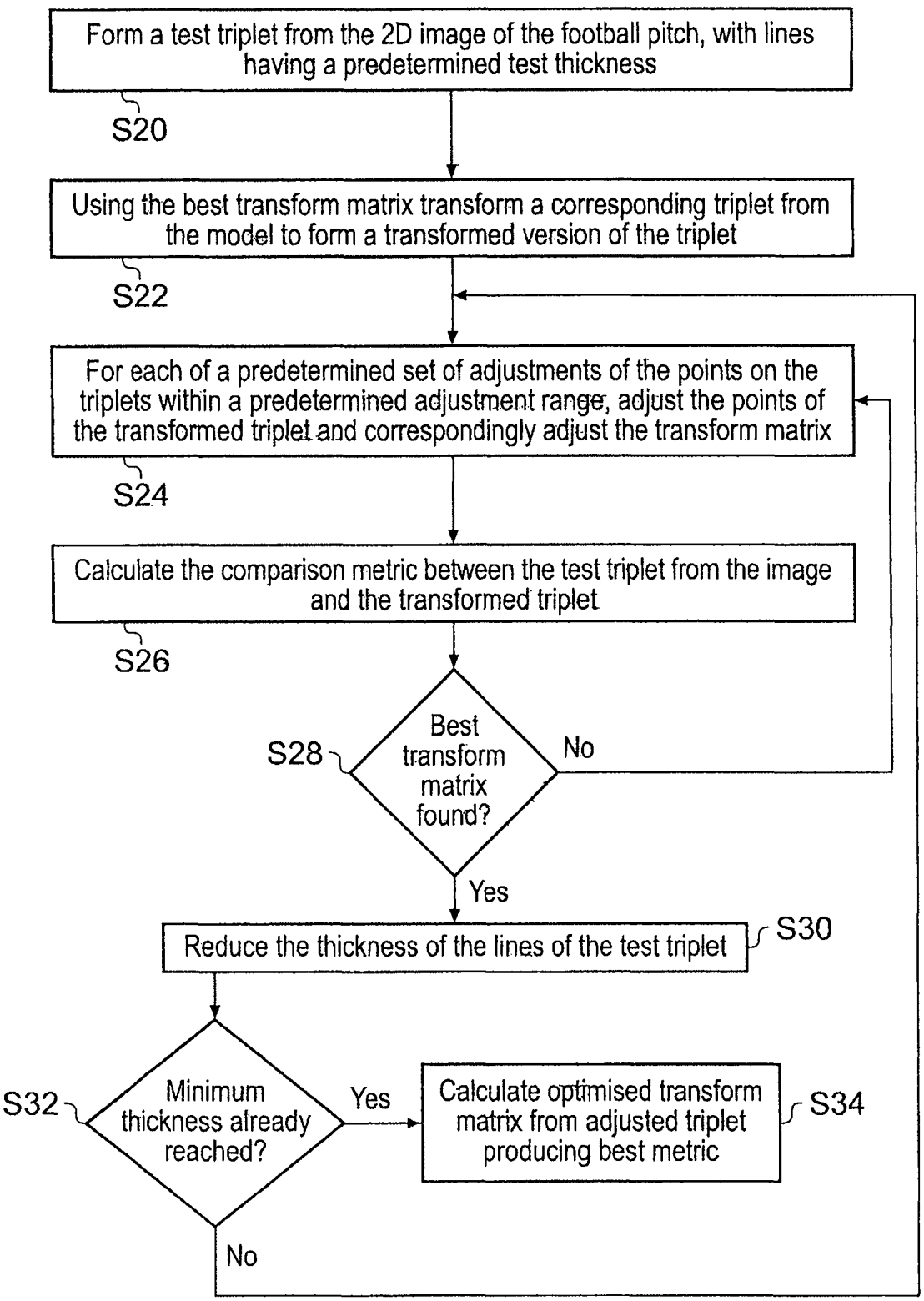
FIG. 8 is an example flow diagram illustrating a process for refining the calculated transform matrix for transforming points within the model to the image.

After identifying a best guess of the transform matrix for transforming points in the model plane to the image plane, FIGS. 7 and 8 illustrate a process for optimising the transform matrix to improve the accuracy of the translation of points within the plane of the football pitch within the model to the plane of the football pitch within the two dimensional image 12, 10.

As shown in FIG. 7, a process of optimising the transform matrix is illustrated pictorially from a first line of process steps 60. As shown in FIG. 7 the triplet from the model 40 which was used to identify the best transform matrix is used to transform the model triplet into a transformed triplet 62 and pixels along lines formed between the points are used to form a transformed feature 62. An image triplet 64 corresponding to the model sample triplet 40 has been identified during the generation of the transform matrix illustrated in the first step of generating the transform matrix. The corresponding triplet can be found by simply using the best transform matrix calculated above, to transform the triplet of points in the model to a triplet of points in the image and extracting image pixels along lines between the transformed points.

The corresponding triplet from the image is then expanded to the effect that the lines of the test feature instead of being one pixel wide are expanded to be N pixels wide where N is an integer number. Thus, as shown in FIG. 7, an expanded test feature 66 is produced, which includes all corresponding image pixels from the camera view, which may include the real lines 65 from the image. The expansion by N pixels therefore increases an amount of the image, which appears in the test feature 66.

As shown in a second line 68 in FIG. 7 a comparison metric is calculated between the transformed feature 62 and the test feature 66 in a corresponding way to that described above noting however, that since the test feature has been expanded in width by N pixels of the image, then it is more likely to produce a contribution which adds to the metric, because the expanded feature is more likely to include the lines of the football pitch 65.

As illustrated by the third line 70 in FIG. 7 each of the points $((x_{1n}y_{1n})_i, (x_{2n}y_{2n})_i, (x_{3n}y_{3n})_i)$ is in turn shifted by a sub-pixel amount ($\delta x$, $\delta y$) one at a time and the metric recalculated until after cycling through a predetermined number of shifts of each of the points of the triplet of the image a best metric is identified. The shifting of the points can be represented as follows:

---

For each of $((x_{1n}y_{1n})_i, (x_{2n}y_{2n})_i, (x_{3n}y_{3n})_i)$,
    for each of u = 1 to K
        form $((x_{1n} + \delta x \times u, y_{1n} + \delta y \times u)_i, (x_{2n}y_{2n})_i, (x_{3n}y_{3n})_i)$;
        form transformed feature;
        calculate comparison metric with test feature;
        form $((x_{1n}y_{1n})_i, (x_{2n} + \delta x \times u, y_{2n} + \delta y \times u)_i, (x_{3n}y_{3n})_i)$;
        form transformed feature;
        calculate comparison metric with test feature;
        form $((x_{1n}y_{1n})_i, (x_{2n}y_{2n})_i, (x_{3n} + \delta x \times u, y_{3n} + \delta y \times u)_i)$;
        form transformed feature;
        calculate comparison metric with test feature;
    end
end

---

Since a shift of the transformed feature with respect to an original version of the transformed feature 64 is known, a corresponding adjustment in the transform matrix can be determined in order to optimise the transform matrix.

Having performed an optimisation of the transform matrix with respect to the test feature, which is N pixels wide, then the width of the test feature is reduced by one pixel and the optimisation of the transform matrix is repeated. That is, the image pixels are reduced by one pixel, reducing the view of the viewed lines 65. Iteratively, this process is repeated with the width of the test feature being reduced by one until the test feature is only one pixel wide. At this point, the optimisation process has been completed and the process terminates with the optimised transform matrix.

In other embodiments, a further test triplet can be selected, similar to the test feature 64 as shown in FIG. 7 and a test feature formed. Optimisation of the transform matrix with respect to that triplet can then be repeated to produce a further refinement in the transform matrix.

FIG. 8 provides an illustrative process for the refinement of the transform triplet as represented in FIG. 7. The steps of the flow diagram as shown in FIG. 8 are summarised as follows:

S20—a test triplet is formed by extracting a triplet identifying two intersecting lines within the 2D image view of the football pitch. The lines are then expanded to N pixels to have a predetermined test thickness to form a test feature of pixels extracted from the image.

S22—using the best transform matrix identified from the previous process, a triplet from the model corresponding to the test triplet is transformed to form a transform version of the triplet of lines connecting the transformed triplet are introduced to form a transformed feature.

S24—for each of the predetermined set of adjustments of the points of the triplets within a predetermined adjustment range, the points of the transformed triplet are adjusted by a sub-pixel amount and the transformed feature correspondingly adjusted.

S26—a comparison metric is then calculated representing a comparison between the test feature from the image and the transformed feature.

S28—has the best comparison metric and correspondingly the best transform matrix been found as a result of all possible shifts within a predetermined range of each of the points of the transform triplet? If not, then the process loops back to step S24 and further shift of the points of the transform triplet is performed. If the best shift of the transform triplet has been found which produces the best comparison metric with respect to the test triplet with an adjusted line thickness, then processing proceeds to step S30.

S30—the thickness of the lines of the test feature are reduced by one pixel in order to repeat the optimisation process according to steps S24 to S28.

S32—has the minimum thickness of one pixel already been reached? If no, then processing loops back to the start of step S24 and steps S24 to S28 and S30 are repeated to further refine the transform matrix. If the minimum thickness of one pixel has been reached, the processing passes to step S34.

S34—an optimised transform matrix is calculated for the shift of the transformed feature producing the best comparison metric.

At this point a refinement of the transform matrix has been produced, which can be used to transform points within the model to points within the image view.

Figure 9:
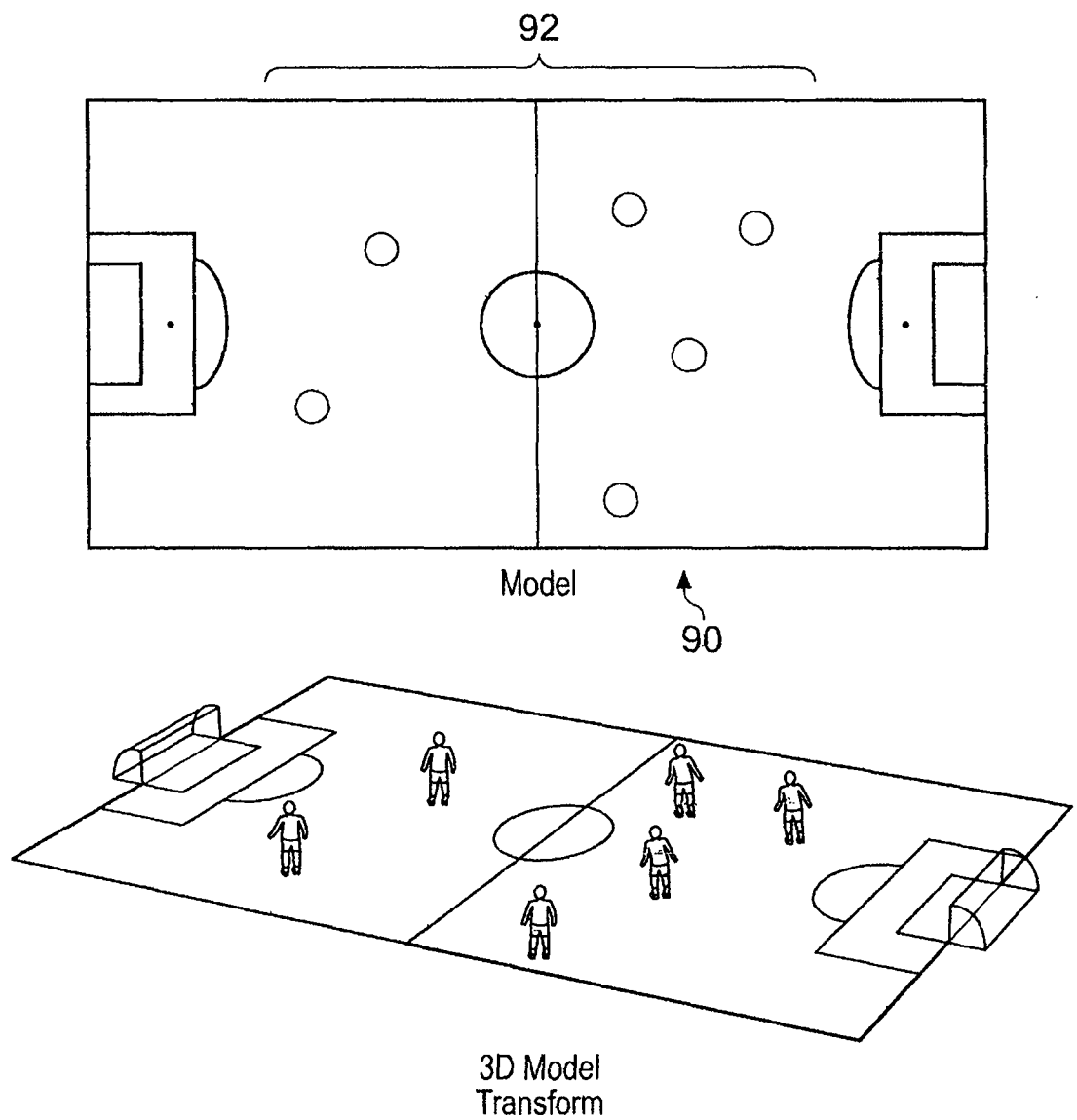
FIG. 9 is an illustration of an example application of the refined transform matrix for transforming 3D models within the model plane onto the two-dimensional image view produced by a camera.

Other example embodiments of the present invention are illustrated with respect to FIG. 9. As represented above a transform matrix is calculated for translating points within a 2D plane formed by the football pitch between a model view of that football pitch to an image view of the football pitch. However, correspondingly a three dimensional translation can be performed from the model view of the pitch into a simulated version of the image view of the pitch. As illustrated in FIG. 9, a model view 90 could include a plurality of simulated players 92 within a plane of the model football pitch. However, if each of these players 92 are provided with a height then the players become 3D objects which can be translated from the model view into the image view for super position on the image view. Moreover, a 2D image view of the pitch can be completely constructed by transforming the model view into the image view as it would be seen by camera. Furthermore, in the image view can be translated by translating between the model view and the image view which can have an effect of shifting the position of the camera in space to adopt different views of the football pitch within the simulated image view. Thus, a virtual representation can be made of the image of the football pitch by making a corresponding an appropriate translations from the model view into the image view. A mathematical representation of the translation of the 3D objects from the model view to the image view is provided using known techniques, such as that explained in the appendix of the above referenced paper entitled "Flexible Calibration by Viewing a Plane from Unknown Orientations" by Zhengyou Zhang published in 1999 in ICCV, volume 1, page 666.

Tracking Overlaid on Live Video

According to the present technique tracking information, which is generated with respect to a 3D model of a 2D image of a football match as described above, can be added to the video images captured by a video camera. Once a relative position of the players have been identified with a relatively high probability then the position of that player within the 2D video image of the camera is known. Accordingly, a graphic illustrating an identity of that player, as estimated by the tracking algorithm, can be overlaid on to the live video feed from the camera by the content processing workstation 4. Thus, as shown in FIG. 10, each of the players 300, 302, 304, 306 is provided with a corresponding label 308, 310, 312, 314 which is then used to follow that player around the pitch in order to track the identity of that player.

Figure 10:
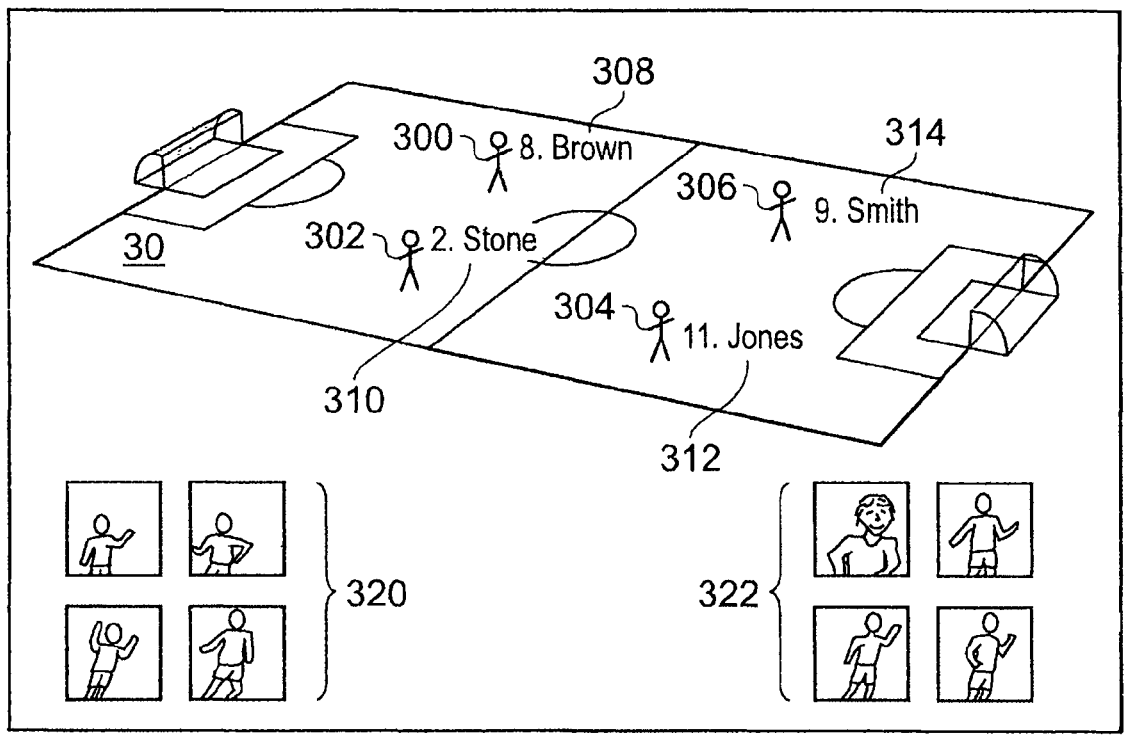
FIG. 10 is a representation of a video image of a football match in which portions of the image have been isolated to track the players and in which a graphical feature has been added.

Also shown within an image view shown in FIG. 10 are two sets of extracted images 320, 322. Each of the sides on the football pitch is provided with one of the sets of extracted images 320, 322. Each image is an isolated section of the image provided from the camera 20, which aims as far as possible to isolate that player on the football pitch. Thus, having identified each of the players, then the image of that player within the video image can be extracted and displayed with other players within each of the sets corresponding to each of the teams on the football pitch. This presentation of the extracted images can provide an automatic isolation of a view of a particular player without a requirement for a separate camera to track that player throughout the football match. Thus, with a single camera provided that camera can see the entire football pitch, then each of the players can be tracked throughout the match.

If a graphic feature or effect is introduced into the video image by mapping that feature or effect from the model of the football pitch into the real image, for example, within the plane of the pitch as described above, then the extracted images within each of the sets 320, 322 should also include that portion of the image. This can by first extracting a part of the video images in which an object to be viewed is present. In a first way, if the camera is moving then the position of the camera in each frame must be locked to the model, by calculating a transform matrix from a model to the image for each image frame. Having determined a position of the player which is to be extracted from the image, then the relative portion of the graphic feature or effect can then be mapped from the model into the portion of the image, which is to be used to isolate the particular player to form the sets of images 320, 322.

As an alternative, the graphical feature or effect can be introduced into a high definition version of the video image of the football pitch and a section of that image cut out or extracted from the version of the image, which includes the graphic image feature or effect. Thus, rather then process the part of the image and transforming the part of the graphic, which is present within the corresponding part of the three dimensional model for each frame, the graphical feature is transformed from the three dimensional model and added to the whole of the object plane (football pitch). Thereafter a composite video image is formed in which the graphical feature is present and a part of that composite image extracted to view the player of interest.

Figure 11:
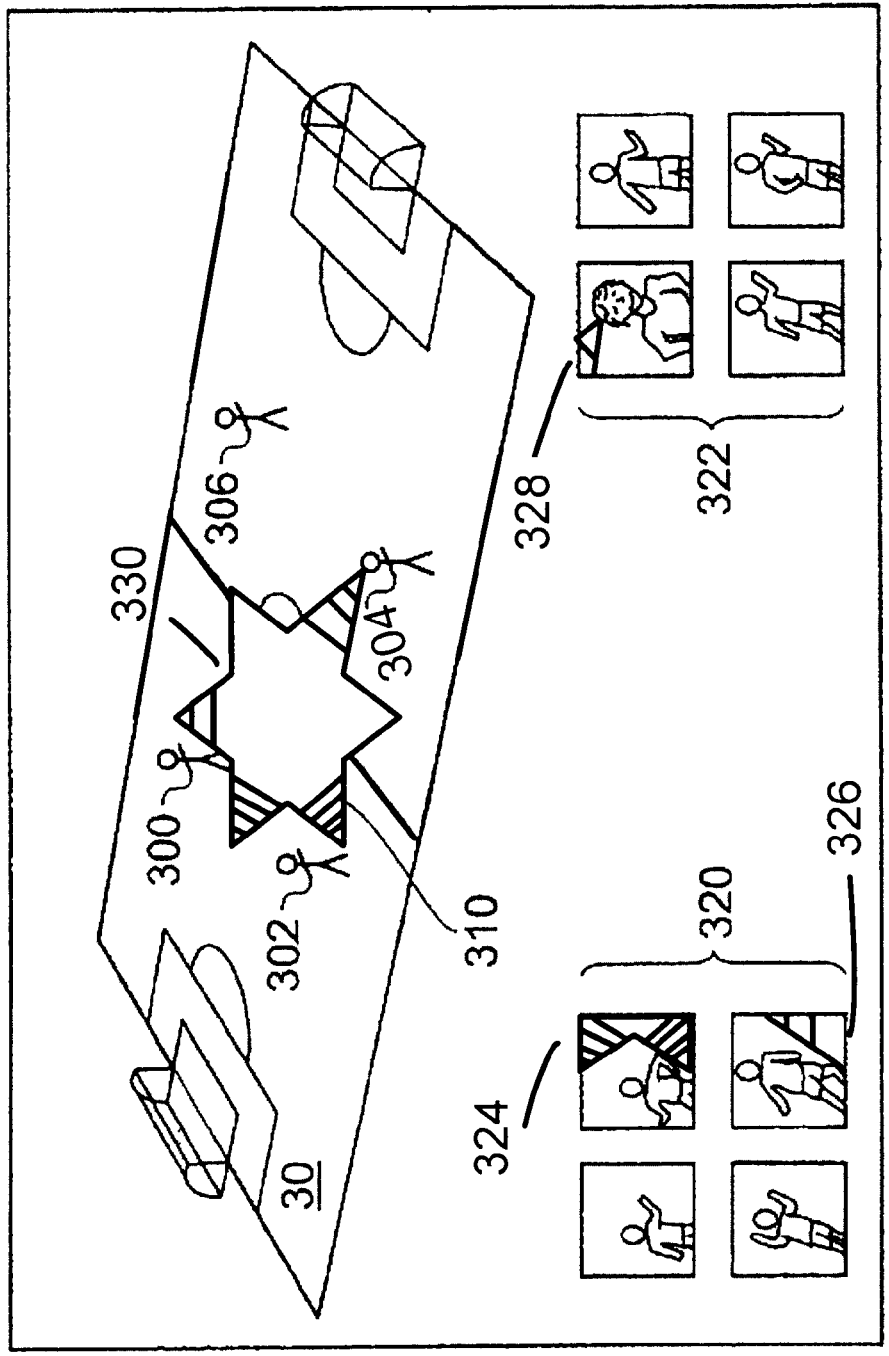
FIG. 11 is a representation of a video image of a football match in which portions of a graphical feature are shown in extracted images of tracked players.

Referring now to FIG. 11, a graphic feature or effect 330 is shown. Portions 324, 326, and 328 of the graphic feature or effect 330 are each shown in the extracted images within the sets 320, 322. The part of the graphic feature or effect 330 closest to player 302 is shown in the extracted image in set 320 as portion 324. The part of the graphic feature or effect 330 closest to player 300 is shown in the extracted image in set 320 as portion 326. The part of the graphic feature or effect 330 closest to player 304 is shown in the extracted image in set 322 as portion 328. Note that the extracted image of player 306 does not include a portion of the graphic feature or effect 330, insofar as the extracted image of the player 306 is relatively distant from the graphic feature or effect 330.

According to the present technique any method of calibrating the camera with respect to the three dimensional model can be used, although the technique explained above for calculating the transform matrix for providing camera lock provides one example.

In order to identify the part of the video images which are to be extracted to view the desired player (object) some examples can identify each of the plurality of objects on the object plane, by generating object path data which represents a position of each of the plurality of objects which have been identified on the object plane with respect to time. In one example, the object path data which tracks each of the objects can be generated according to a technique disclosed in a UK patent application filed on 5 Sep. 2007 under the Applicant's reference P030984GB, the contents of which are incorporated herein by reference. The user then provides an indication of a desired view of one of the objects. The part of the video images are then extracted from the video images by identifying the object, which is to be viewed from the user indication and the object path tracking data, which provides a position of the user indicated object on the object plane with respect to time. The part of the video images which include the user indicated object as identified by the object path data is then extracted, which includes correspondingly that part of the graphical feature corresponding to that part of the plane of the three dimensional model, because this has already been introduced into the view of the object plane in the video images.

Various modifications can be made to the examples herein before described within departing from the scope of the present invention as defined in the appended claims. For example, although example embodiments have been described with reference to a football pitch, other example applications can be utilised in which a view of a scene including a planar area can be viewed by a camera and correspondingly formed into a model. As will be appreciated, mathematically the translation from the model to the image can be converted from a translation from the image to the model and therefore the translation can be calculated from the image to the model first and then the corresponding translation from the model to the image calculated therefrom.

The invention claimed is:

1. A method of introducing a graphical feature or effect into one or more video image frames, the method comprising:
   forming a three dimensional model view of an object plane;
   calculating a transform matrix for transforming points in the three dimensional model view of the object plane into an image view of the object plane, the image view of the object plane being represented in the one or more video image frames, the one or more video image frames including images of a scene that includes a view of a plurality of objects disposed on the object plane;
   forming the graphical feature or effect in the three dimensional model view of the object plane;
   transforming the graphical feature or effect from the three dimensional model view to the image view of the object plane using the transform matrix;

identifying each of the plurality of objects within the one or more video image frames; and extracting plural parts of each of the one or more video image frames, each part including a different one of the plurality of objects on the object plane, into which the graphical feature or effect has been transformed, each of the extracted parts including a portion of the graphical feature or effect, wherein calculating the transform matrix includes calculating a comparison metric between lines formed between a plurality of points transformed from lines of the object plane in the three dimensional model view and corresponding lines between a triplet of points in an identified plurality of triplets of points obtained from the image view of the object plane, and identifying the transform matrix, the transform matrix being an optimal transform matrix which produces an optimal comparison metric.

2. The method as claimed in claim 1, wherein the video image frames provide a two dimensional view of the object plane, the object plane including a plurality of lines or edges defining features on the object plane, and wherein the calculating the transform matrix, includes identifying a plurality of triplets of points on the lines or edges of the object plane in the image view, the image view being obtained from a camera, each of the triplets providing three or more non co-linear points on the lines or edges of the object plane, identifying a sample triplet of points in the three dimensional model view, for each of the identified plurality of triplets, calculating a transform matrix which transforms the sample triplet from the three dimensional model view into the respective one of the identified plurality of triplets obtained from the image view, for each of the calculated transform matrices, calculating a transformation of a plurality of points on the lines of the object plane in the three dimensional model view, calculating a comparison metric between lines formed between the plurality of points transformed from the lines of the object plane in the three dimensional model view and corresponding lines between a triplet of points in the identified plurality of triplets of points in the image view of the object plane, and identifying an optimal transform matrix which produces an optimal comparison metric, the optimal transform matrix being used for transforming points on the three dimensional model view into the image view obtained from the camera, or for transforming points in the image view into the three dimensional model view.

3. The method as claimed in claim 1, wherein the video image frames are high definition video image frames obtained from a high definition video camera.

4. The method as claimed in claim 1, wherein the identifying each of the plurality of objects includes identifying each of the plurality of objects on the object plane, generating object path data which represents a position of each of the plurality of objects, which have been identified on the object plane, with respect to time, and receiving an indication from a user of a desired view of one of the plurality of objects, and wherein the extracting the plural parts of the image view includes identifying the one of the plurality of objects, which is to be viewed from the desired view and based on the object path data, which provides a position of the user-indicated object on the object plane with respect to time, and wherein extracting the plural parts of the video images includes extracting the one of the plurality of objects, the one of the plurality of objects being indicated by the user and identified by the object path data.

5. The method as claimed in claim 1, wherein the plurality of objects are players on a sports field, the object plane being the sports field.

6. The method as claimed in claim 1, wherein a high definition video camera is positioned to provide a view of the scene, and to generate video signals corresponding to the plurality of objects on the object plane.

7. The method as claimed in claim 1, further comprising:

capturing video signals from each of two high definition video cameras; and combining the captured video signals from each of the high definition video cameras to form the scene that includes the view; and generating video signals of the plurality of objects on the object plane from the video signals which have been combined from each of the high definition video cameras.

8. An image processing apparatus operable to introduce a graphical feature or effect into one or more video image frames, the image processing apparatus comprising:

a data processor, which is operable to form a three dimensional model view of an object plane, to calculate a transform matrix for transforming points in the three dimensional model view of the object plane into an image view of the object plane, the image view of the object plane being represented in the one or more video image frames, the one or more video image frames including images of a scene that includes a view of a plurality of objects disposed on the object plane, to form the graphical feature or effect in the three dimensional model view of the object plane, to transform the graphical feature or effect from the three dimensional model view to the image view of the object plane using the transform matrix, to identify each of the plurality of objects within the one or more video image frames, and to extract plural parts of each of the one or more video image frames, each part including a different one of the plurality of objects on the object plane, into which the graphical feature or effect has been transformed, each of the extracted parts including a portion of the graphical feature or effect, wherein in calculating the transform matrix, the data processor is further operable to calculate a comparison metric between lines formed between a plurality of points transformed from lines of the object plane in the three dimensional model view and corresponding lines between a triplet of points in an identified plurality of triplets of points obtained from the image view of the object plane, and identify the transform matrix, the transform matrix being an optimal transform matrix which produces an optimal comparison metric.

9. The image processing apparatus as claimed in claim 8, wherein the video image frames provide a two dimensional view of the object plane, the object plane including a plurality of lines or edges defining features on the object plane, and wherein, in calculating the transform matrix, the data processor is further operable to identify a plurality of triplets of points on the lines or edges of the object plane in the image view, the image view being obtained from a camera, each of the triplets providing three or more non co-linear points on the lines or edges of the object plane, to identify a sample triplet of points in the three dimensional model view, to calculate, for each of the identified plurality of triplets, a transform matrix which transforms the sample triplet from the three dimensional model view into the respective one of the identified plurality of triplets obtained from the image view, for each of the identified plurality of triplets, to calculate a transformation of a plurality of points on the lines of the object plane in the three dimensional model view, for each of the calculated identified transform matrices, to calculate a comparison metric between lines formed between the plurality of points transformed from the lines of the object plane in the three dimensional model view and corresponding lines between a triplet of points in the identified plurality of triplets of points in the image view of the object plane, and to identify an optimal transform matrix which produces an optimal comparison metric, the optimal transform matrix being used for transforming points on the three dimensional model view into the image view obtained from the camera, or for transforming points in the image view into the three dimensional model view.

10. The image processing apparatus as claimed in claim 8, wherein the video image frames are high definition video image frames obtained from a high definition video camera.

11. The image processing apparatus as claimed in claim 8, wherein
  the data processor is operable to identify each of the plurality of objects which is to be viewed within the part of the video image by
    identifying each of the plurality of objects on the object plane,
    generating object path data which represents a position of each of the plurality of objects, which have been identified on the object plane, with respect to time, and
    receiving an indication from a user of a desired view of one of the plurality of objects, and
  wherein the extracting the plural parts of the image view includes
    identifying the one of the plurality of objects, which is to be viewed from the desired view and based on the object path data, which provides a position of the user indicated object on the object plane with respect to time, and
  wherein extracting the plural parts of the video images includes extracting the one of the plurality of objects, the one of the plurality of objects being indicated by the user and identified by the object path data.

12. The image processing apparatus as claimed in claim 8, wherein the plurality of objects are players on a sports field, the object plane being the sports field.

13. The image processing apparatus as claimed in claim 8, wherein a high definition video camera is positioned to provide a view of the scene, and to generate video signals corresponding to the plurality of objects on the object plane.

14. The image processing apparatus as claimed in claim 8, wherein the video images are generated by capturing video signals from each of two respective high definition video cameras, the data processor being operable to:

combine the captured video signals from each of the high definition video cameras to form the scene that includes the view; and
generate video signals of the plurality of objects on the object plane from the video signals which have been combined from each of the high definition video cameras.

15. A non-transitory computer readable storage medium having computer readable program codes embodied in the medium, which when executed, cause a data processor to execute the method according to claim 1.

16. An apparatus for introducing a graphical feature or effect into one or more video image frames, the apparatus comprising:
  means for forming a three dimensional model view of an object plane;
  means for calculating a transform matrix for transforming points in the three dimensional model view of the object plane into an image view of the object plane, the image view of the object plane being represented in the one or more video image frames, the one or more video image frames including images of a scene that includes a view of a plurality of objects disposed on the object plane;
  means for forming the graphical feature or effect in the three dimensional model view of the object plane;
  means for transforming the graphical feature or effect from the three dimensional model view to the image view of the object plane using the transform matrix;
  means for identifying each of the plurality of objects within the one or more video image frames; and
  means for extracting plural parts of each of the one or more video image frames, each part including a different one of the plurality of objects on the object plane, into which the graphical feature or effect has been transformed, each of the extracted parts including a portion of the graphical feature or effect, wherein
  the means for calculating the transform matrix
    calculates a comparison metric between lines formed between a plurality of points transformed from lines of the object plane in the three dimensional model view and corresponding lines between a triplet of points in an identified plurality of triplets of points obtained from the image view of the object plane, and
    identifies the transform matrix, the transform matrix being an optimal transform matrix which produces an optimal comparison metric.

17. The method as claimed in claim 1,
wherein each extracted part including one of the plurality of objects and the portion of the graphical feature or effect is displayed at a new location, in the image view of the object plane, that is different from an initial location at which the extracted part was extracted.

18. The method as claimed in claim 1,
wherein the identifying includes determining a team association of each of the plurality of objects.

19. The method as claimed in claim 1,
wherein each extracted part including a different one of the plurality of objects includes a different portion of the graphical feature or effect.

20. The method as claimed in claim 1,
wherein the one or more video image frames are obtained by a single imaging device.

21. The image processing apparatus as claimed in claim 8, wherein, in calculating the transform matrix, the data processor is further operable to calculate a transform matrix which transforms a sample triplet in the three dimensional model view into one of an identified plurality of triplets obtained from the image view, for each of the identified plurality of triplets.

22. The image processing apparatus as claimed in claim 8, wherein, in calculating the transform matrix, the data processor is further operable to calculate a transformation of a plurality of points on lines of the object plane in the three dimensional model view.

23. The image processing apparatus as claimed in claim 8, wherein
   the transform matrix further transforms points on the image view into the three dimensional model view.

* * * * *